April 21, 1925.

W. L. SMITH

SERVING DISH

Filed Sept. 28, 1921

INVENTOR.
William L. Smith.
BY
ATTORNEY.

Patented Apr. 21, 1925.

1,534,471

UNITED STATES PATENT OFFICE.

WILLIAM LEONARD SMITH, OF CAMDEN, NEW JERSEY.

SERVING DISH.

Application filed September 28, 1921. Serial No. 503,754.

*To all whom it may concern:*

Be it known that I, WILLIAM LEONARD SMITH, a citizen of the United States of America, and resident of Camden, county of Camden, State of New Jersey, have invented certain new and useful Improvements in Serving Dishes, of which the following is a specification.

This invention relates broadly to dishes, and more particularly to an individual dining service designed primarily for use in dining cars and restaurants and at quick lunch counters.

The primary object of the invention is to produce a dish which constitutes a dinner plate and a container or storage receptacle for those articles and implements commonly required in the serving of a guest, such articles usually comprising knives, forks, spoons, a cup and a saucer.

More specifically stated, it is the aim to provide a dish by means of which hurried service of a guest is greatly simplified, providing such guest in a single self-contained device with all the articles and implements essential aside from containers in which food is served.

In describing the invention in detail, reference is herein had to the accompanying drawings, in which—

Figure 1:
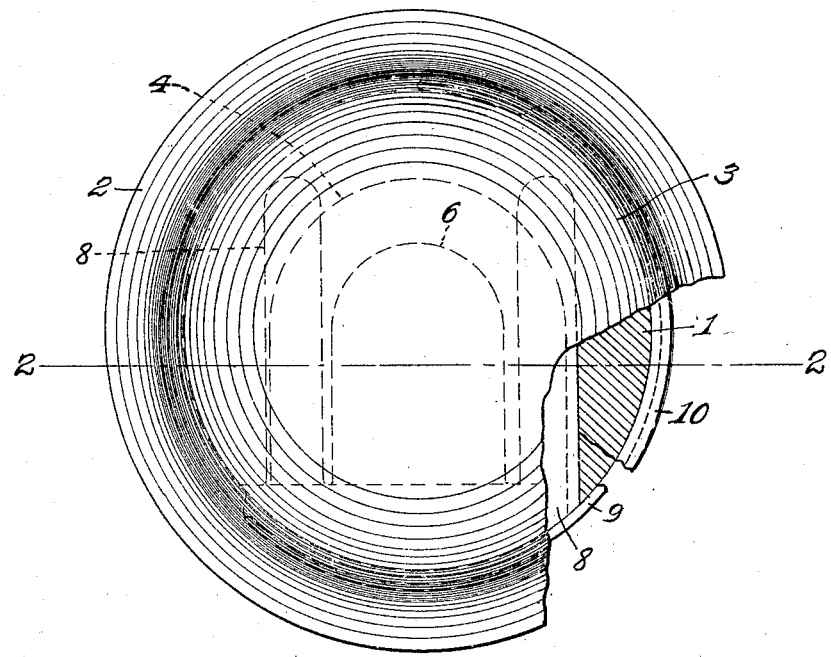
Figure 1 is a top plan view of the invention partly in broken section, and—
Figure 2:
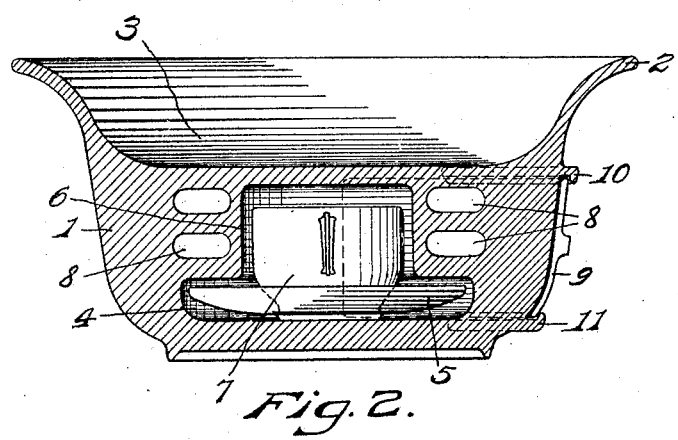
Figure 2 is a central vertical section on line 2—2, Fig. 1.

The dish, which is preferably formed of vitreous clay or glass, comprises a body 1 having formed about the upper part or top thereof an upwardly and outwardly flared flange 2 which forms the outer walls of a receptacle 3 that corresponds in all essential particulars to an ordinary dinner plate and that is designed to serve the purposes of such a plate.

Provided in the extreme lower part of the body 1 is a horizontal chamber 4 opening through a side of said body and having a shallow depth adapted for the reception of an ordinary saucer 5, said chamber extending inward a sufficient distance to permit of the introduction of such saucer to a position in which its center is in the axial center of the dish. Also formed in said body above said chamber 4 and opening at its lower end into the latter is a chamber 6 of less width and length than said chamber 4, the same being adapted for receiving a cup 7 carried by the saucer 5.

Provided in the body 1 at opposite sides of the chamber 6 and parallel to the length of the latter is a plurality of small chambers 8 of forms and sizes adapting them for the reception of knives, forks and spoons.

A slidable closure 9 of arcuately curved form corresponding to the circumferential curvature of the body 1 is designed to be shifted into and out of closing relation to the mouths of the various chambers provided, as aforesaid, in said body, the upper and lower edges of said closure being disposed in runways or channels provided in the confronting faces of suitable narrow flanges 10 and 11 formed on said body at appropriate levels.

What is claimed is—

1. A serving dish comprising a one-piece molded body having its upper part shaped to form a receptacle of dinner-plate form, the portion of said body below said receptacle providing a horizontally disposed chamber having a shape and size which substantially conforms to that of a cup and saucer when disposed in conventional superposed relation, said chamber being adapted for the reception of such a cup and saucer in a position substantially in the axial line of the dish, and a horizontally slidable closure for said chamber.

2. A serving dish comprising a one-piece molded body having its upper part shaped to form a receptacle of dinner-plate form, the portion of said body below said receptacle providing a horizontally disposed chamber having a shape and size which substantially conforms to that of a cup and saucer when disposed in conventional superposed relation, said chamber being adapted for the reception of such a cup and saucer in a position substantially in the axial line of the dish, and said body also having therein laterally of said chamber a plurality of smaller horizontally disposed chambers adapted for the individual accommodation therein of knives, forks and spoons.

3. A serving dish comprising a body having its upper part shaped to provide a receptacle of dinner plate form, the portion of said body below said receptacle being provided with a plurality of horizontally disposed chambers which open outward through a side of the body and which are shaped to substantially conform to and adapted for the reception of various table articles, one of said chambers being designed for the reception of a cup and saucer disposed in conventional seated relation, and a closure slidable horizontally into and out of closing relation to said chambers, said body having external channeled flanges on which the edges of said closure are slidable.

4. As a new article of manufacture, a plate having a thickened bottom portion provided with a recess whereby a dish may be carried therein.

5. As a new article of manufacture, a plate having a thickened bottom portion having a recess therein and provided with flanges extending from the side of said bottom portion above and below the opening of said recess, and a sliding closure positioned between said flanges for closing said recess.

6. As a new article of manufacture, a molded dish having a thickened bottom portion having a recess therein for the reception of another dish so that the latter may be carried by the former.

In testimony whereof, I affix my signature in presence of two subscribing witnesses.

WILLIAM LEONARD SMITH.

Witnesses:
    LUTHER McFARLIN,
    WILLIAM H. BONNER.